(No Model.)

A. ROBINSON.
HARVESTER.

No. 293,358. Patented Feb. 12, 1884.

Witnesses,
Geo. H. Strong.
J. H. Krouse

Inventor,
Alex. Robinson
By Dewey & Co.
Attorneys

UNITED STATES PATENT OFFICE.

ALEXANDER ROBINSON, OF BENICIA, ASSIGNOR TO THE BENICIA AGRICULTURAL WORKS, OF SAN FRANCISCO, CALIFORNIA.

HARVESTER.

SPECIFICATION forming part of Letters Patent No. 293,858, dated February 12, 1884.

Application filed July 20, 1883. (No model.)

*To all whom it may concern:*

Be it known that I, ALEXANDER ROBINSON, of Benicia, county of Solano, and State of California, have invented an Improvement in Harvesters; and I hereby declare the following to be a full, clear, and exact description thereof.

My invention relates to a new and useful improvement in that class of agricultural implements known as "harvesters" or "headers;" and it consists in a spring-hinge connection between the pole and the main frame of the harvester, whereby the operation of raising the front of the harvester from the ground is rendered easy, all as will be hereinafter fully described, and set forth in the claims hereto annexed.

In implements of this class the pole or its cross-bar is hinged to the main frame, and a long lever, which is attached to and fulcrumed upon said frame, is operated to raise or lower the front by turning the frame on its main wheels as fulcrums; but when the frame has been turned down at an inclination it is difficult to raise it, because of its great weight and the thrust of the horses, and in order to assist this operation, ballast placed upon the end of the lever is commonly employed as a counterbalance; and I am aware that various springs have been attached to the lever and pole to accomplish this object. These, however, merely assist the operation of the lever, and are to a certain extent cumbersome and in the way, and are not of sufficient compass to allow the lever enough play, but will, as they are progressive in their strength, interfere with a free movement of the lever. By my invention I propose to accomplish the result directly by the connection or hinge between the beam and frame.

Figure 1:
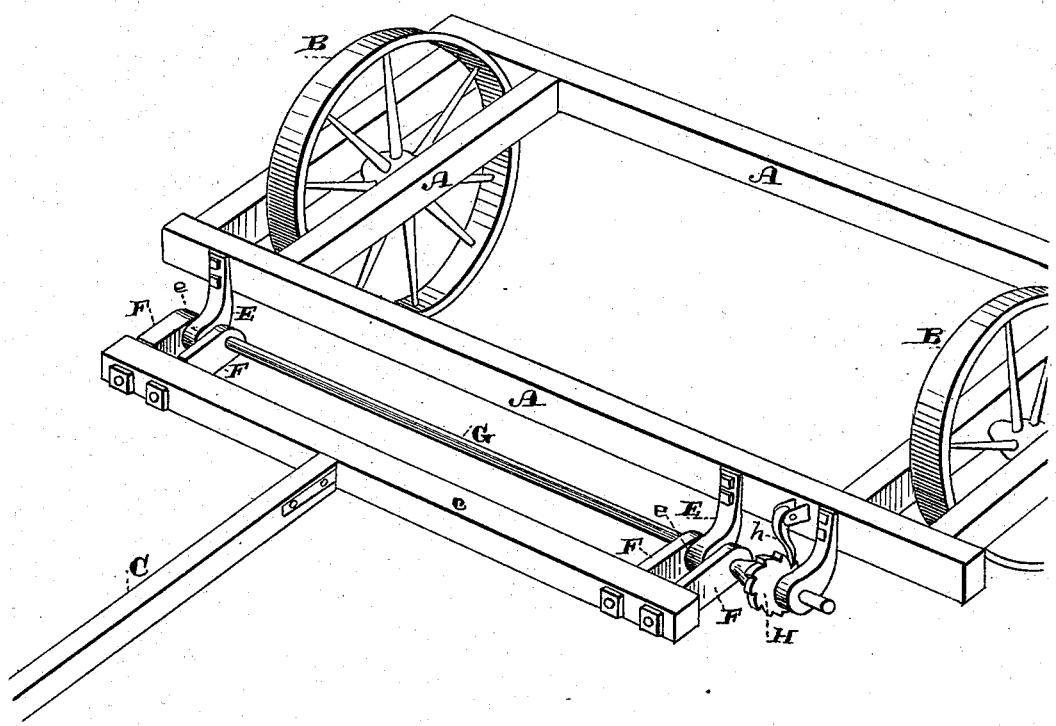
Figure 2:
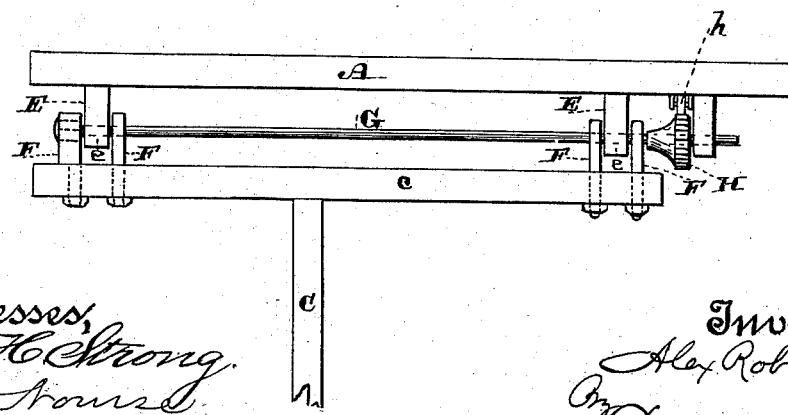

Referring to the accompanying drawings, Figure 1 is a perspective view of a portion of a header. Fig. 2 is a top view of the same, with a portion of the header-frame and supporting-wheels left off.

A is a portion of the main frame of a harvester. B B are its wheels. C is the pole, having a cross-bar, c.

To the back of the rear sill of frame A are bolted curved bars E, which have eyes e in their ends. There are two of these bars at one side and one at the other.

In the ends of cross-bar c are eyebolts F.

G is a metal rod, which is passed through the eyebolts F and the bars E. This rod serves, in the first place, as the pintle or shaft of the hinge-connection thus formed. The bars E curve down and back, and the eyebolts F extend straight forward, thus throwing the hinge below the rear sill of frame A, which gets it out of the way of other parts. (Not shown.) The rod G, where it passes through the eyebolt F or its equivalent, at one end is made square, and the eye in said bolt is also squared, so that the rod cannot turn therein. Through all the other eyebolts and bars it passes loosely, and is adapted to be turned therein. Upon the other end of rod G is keyed a ratchet-wheel, H, with which a pawl, *h*, pivoted to the back of the sill of the frame, engages.

I have not deemed it necessary herein to illustrate the main operating-lever, as it is well known. When, by its movement, the frame is allowed to incline to throw its front near the ground, and its rear end and the forward end of the pole rise, the rod G is twisted and becomes a torsion spring. The ratchet H, being a wheel, provides for so setting the rod as to obtain more or less torsion, whereby it may be adjusted to any harvester, no matter of what style or weight. This torsion of the rod is the result of its square portion at one end in one of the eyebolts F of the cross-bar of the pole, and the ratchet-and-pawl device at the other end, connected with the rear sill of frame A. This pawl engages the ratchet to prevent the rod from turning at that end while it is being twisted at the other end. The tendency of this torsion-spring is to return the frame A, and this it does, or assists in doing, when relieved by the movement of the main lever. This spring-connection direct between the pole and frame is simple and effective, and leaves the main lever unincumbered.

I am aware that torsion-springs have been used before for a similar purpose, and I do not claim such, broadly; but

What I claim as new, and desire to secure by Letters Patent, is—

1. In a harvester, the pole C and wheeled frame A, hinged thereto, to adapt it to be adjusted to an inclination, in combination with an intervening torsion-spring forming the pivotal connection between said pole and frame, and having a tendency to return said frame from its inclination, substantially as herein described.

2. In a harvester, the pole C, having cross-bar c, and the wheeled frame A, in combination with the metal rod G, hinging the cross-bar and frame, and a means for twisting said rod by the movement of the frame to an inclination to form a torsion-spring, substantially as and for the purpose herein described.

3. In a harvester, the pole C, having cross-bar c and eyebolts F, and the wheeled frame A, having bars E, with eyes e, in combination with the metal rod G, passing through eyebolts F and bars E, and squared at one end in one of said eyebolts F, as described, the ratchet-wheel H on the other end of rod G, and the pawl h on the frame A, all arranged and operating substantially as and for the purpose herein described.

In witness whereof I have hereunto set my hand.

ALEXANDER ROBINSON.

Witnesses:
   C. D. COLE,
   S. H. NOURSE.